(12) United States Patent
Borntrager et al.

(10) Patent No.: US 11,597,453 B2
(45) Date of Patent: Mar. 7, 2023

(54) POWERED HAND TRUCK AND DOLLY SYSTEM FOR ISO CONTAINERS

(71) Applicants: Steven Borntrager, Grayson, KY (US); James Borntrager, Carrier Mills, IL (US)

(72) Inventors: Steven Borntrager, Grayson, KY (US); James Borntrager, Carrier Mills, IL (US)

( * ) Notice: Subject to any disclaimer, the term of this patent is extended or adjusted under 35 U.S.C. 154(b) by 438 days.

(21) Appl. No.: 16/866,082

(22) Filed: May 4, 2020

(65) Prior Publication Data
US 2020/0354002 A1 Nov. 12, 2020

Related U.S. Application Data

(60) Provisional application No. 62/844,633, filed on May 7, 2019.

(51) Int. Cl.
| | | |
|---|---|---|
| *B60P 3/40* | (2006.01) | |
| *B62D 51/00* | (2006.01) | |
| *B66F 9/065* | (2006.01) | |
| *B66F 9/20* | (2006.01) | |
| *B62D 51/02* | (2006.01) | |

(Continued)

(52) U.S. Cl.
CPC .............. *B62D 51/005* (2013.01); *B60P 3/40* (2013.01); *B66F 9/065* (2013.01); *B66F 9/20* (2013.01); *B60P 1/6418* (2013.01); *B62B 5/0086* (2013.01); *B62B 2203/10* (2013.01); *B62D 51/001* (2013.01); *B62D 51/02* (2013.01)

(58) Field of Classification Search
CPC ........ B60P 3/40; B60P 1/6418; B62B 5/0086; B62B 2203/10; B62D 51/005; B62D 51/001; B62D 51/02; B66F 9/065; B66F 9/20; B66F 9/06

USPC .......................................... 414/458; 254/2 R
See application file for complete search history.

(56) References Cited

U.S. PATENT DOCUMENTS

| | | | |
|---|---|---|---|
| 3,631,999 A | 1/1972 | Walerowski | |
| 3,749,438 A | 7/1973 | Loomis et al. | |

(Continued)

FOREIGN PATENT DOCUMENTS

GB 2298858 A 9/1996

OTHER PUBLICATIONS https://www.youtube.com/watch?v=abEID-ZOmd8 (Year: 2012).*
"WingLift—Container Carrier," Copyright @ 2018 WingLift™ website: https://winglift.com/product/.

*Primary Examiner* — Mahdi H Nejad
(74) *Attorney, Agent, or Firm* — Nath, Goldberg & Meyer; Richard C. Litman

(57) ABSTRACT

The powered hand truck and dolly system for ISO (International Organization for Standardization) containers is a system for moving ISO containers. The system includes at least one dolly and a powered hand truck. The hand truck includes two booms that are vertical for storage and rotate into a horizontal position for engaging the container. The ends of the booms have shafts with cams for engaging standard twist lock connector receptacles on one end of the container. Each dolly also has a shaft with a cam for engaging a standard twist lock connector receptacle on the other end of the container. The dollies include bars that are vertical for storage and rotate into a horizontal position for connecting the dollies to one another such that their shafts are appropriately positioned to align with their associated connector.

13 Claims, 8 Drawing Sheets

(51) Int. Cl.
 *B62B 5/00* (2006.01)
 *B60P 1/64* (2006.01)

(56) References Cited

U.S. PATENT DOCUMENTS

| | | |
|---|---|---|
| 4,231,709 A | 11/1980 | Corsetti |
| 4,452,555 A | 6/1984 | Calabro |
| 5,669,750 A * | 9/1997 | Vieselmeyer ............ B66F 9/143 |
| | | 414/664 |
| 6,474,930 B1 | 11/2002 | Simpson |
| D535,454 S | 1/2007 | Wareham |
| 7,597,522 B2 | 10/2009 | Borntrager et al. |
| 7,704,035 B2 | 4/2010 | Borntrager et al. |
| 8,186,931 B2 | 5/2012 | Borntrager et al. |
| 9,139,214 B2 | 9/2015 | Rich et al. |
| 2012/0145978 A1* | 6/2012 | Rich ..................... B62B 3/0637 |
| | | 254/2 R |
| 2017/0174452 A1* | 6/2017 | Borntrager .............. B60P 1/435 |
| 2017/0370113 A1* | 12/2017 | Nyce ........................ B60P 3/40 |
| 2018/0118542 A1* | 5/2018 | Shelagowski ............. B66F 9/24 |
| 2021/0347559 A1* | 11/2021 | Helou, Jr. ............ B65D 88/005 |

* cited by examiner

POWERED HAND TRUCK AND DOLLY SYSTEM FOR ISO CONTAINERS

CROSS-REFERENCE TO RELATED APPLICATION

This application claims the benefit of U.S. Provisional Patent Application No. 62/844,633, filed on May 7, 2019.

BACKGROUND

1. Field

The disclosure of the present patent application relates to large container handling, and particularly to a powered hand truck and dolly system for ISO (International Organization for Standardization) containers.

2. Description of the Related Art

International Organization for Standardization (ISO) containers have become increasingly popular for the transport and storage of household goods and furniture, as well as relatively large quantities of other goods and material. Such containers for general freight are constructed of six orthogonal panels (top, bottom, two sides and two ends), with conventional dimensions of twenty and forty feet in length (although containers are available with lengths from eight feet to fifty-six feet in length), eight feet in width, and 8.6 or 9.6 feet in height. ISO containers also include standard twist lock connectors on their corners, and sometimes forklift pockets on the top and bottom edges along their sides. The twist lock connectors include oblong holes, into which shafts with a cam are inserted and turned to lock the shaft into the connector. Such containers have weights of several hundred pounds when empty, and can weigh perhaps a few thousand pounds when loaded, depending upon the contents. These containers can be difficult to transport from place to place, given their size, potential weight, and lack of wheels. This is especially true on docks, where the containers must fit into tight spaces, and in other inaccessible locations.

One concern when moving and transporting such containers is the desirability of keeping the container, and thus its contents, level. Conventional loading of such containers onto a flatbed results in the forward end of the container, i.e., the end closest to the flatbed, rising as it travels up the ramp to the flatbed, while the opposite end remains at a lower level, just clear of the ground. Tilting the container may result in its contents tipping or falling and being damaged within the container, if those contents are not well secured. Accordingly, various devices and systems for transporting containers, as well as other large and heavy containers and storage units, have been developed in the past. However, such systems often do not include the ability to engage the standard connectors on the corners of the ISO containers, except for cranes and container sidelifters. In addition, when these systems are not in use, they occupy a large footprint, and therefore need a large storage area. Thus, a powered hand truck and dolly system for ISO containers solving the aforementioned problems is desired.

SUMMARY

The powered hand truck and dolly system for ISO (International Organization for Standardization) containers is a system for moving ISO containers. The system includes at least one dolly and a powered hand truck. The hand truck includes two booms that are vertical for storage and rotate into a horizontal position for engaging the container. The ends of the booms have shafts with cams for engaging standard twist lock connectors on one end of the container. Each dolly also has a shaft with a cam for engaging a standard twist lock connector on the other end of the container. The dollies include bars that are vertical for storage and rotate into a horizontal position for connecting the dollies to one another such that their shafts are appropriately positioned to align with their associated connector.

These and other features of the present disclosure will become readily apparent upon further review of the following specification and drawings

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
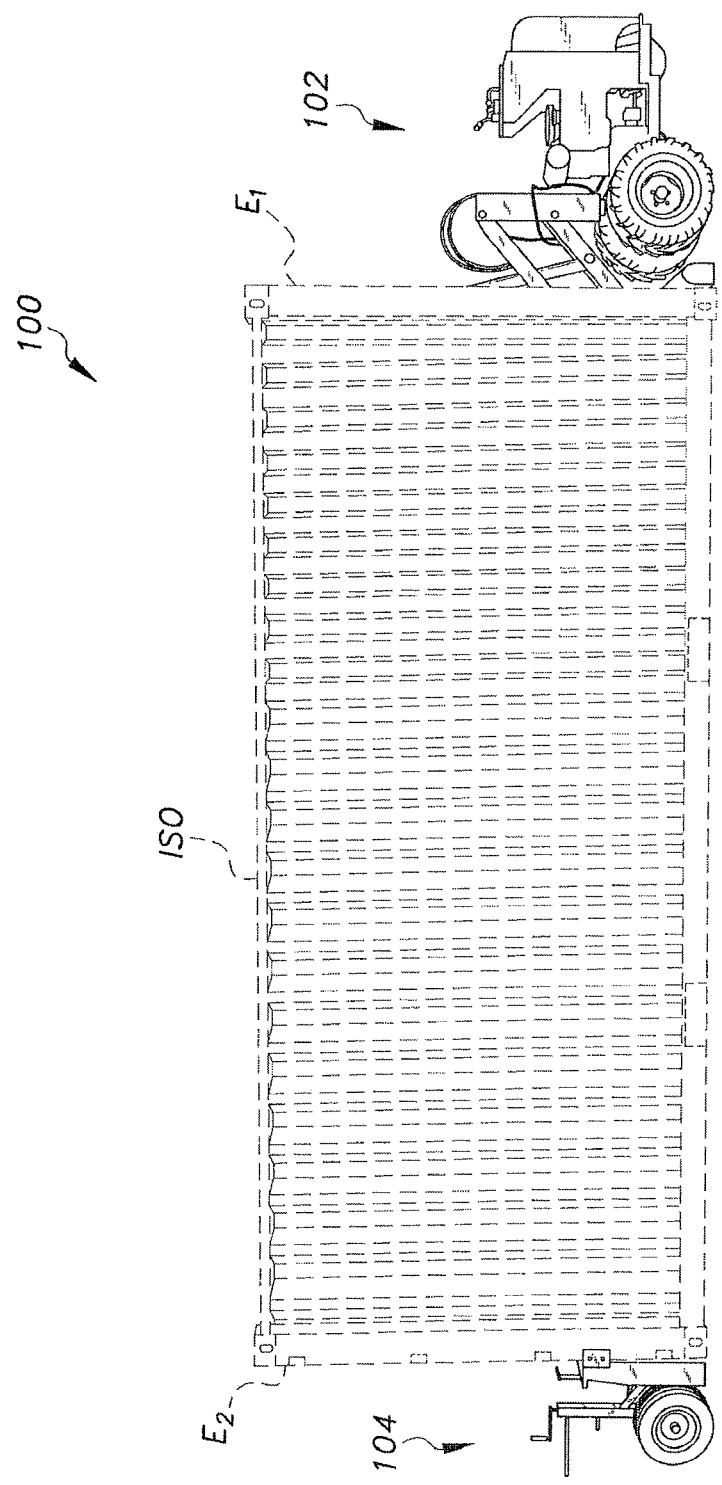
FIG. 1 is an environmental side view of a powered hand truck and dolly system connected to and supporting an ISO container.

As shown in FIG. 1, the powered hand truck and dolly system for ISO containers 100 includes a powered hand truck 102 connected to and supporting a first end $E_1$ of the ISO container and a two dolly system 104 connected to and supporting a second end $E_2$ of the ISO container. The powered hand truck 102 is illustrated in FIGS. 1-5. The powered hand truck 102 can be a machine generally as described in U.S. Pat. No. 8,186,931, issued on May 29, 2012 to Steven Borntrager et al., which is hereby incorporated by reference in its entirety, except that the lifting mechanism includes twist lock connectors instead of forklift tines. The powered hand truck 102 includes a chassis 200 having a drive axle end 202 and an opposite caster wheel end 204, most clearly shown in FIG. 2 of the drawings. A single axle extends laterally across the drive axle end 202 of the chassis 200, the axle having opposed first and second ends.

Only the second end 206 of the axle is shown in the drawings, but it can be seen that the first and second drive wheels 208 and 210 extend from the respective first and second ends of the axle, as in the structure described in the '931 U.S. patent.

Figure 2:
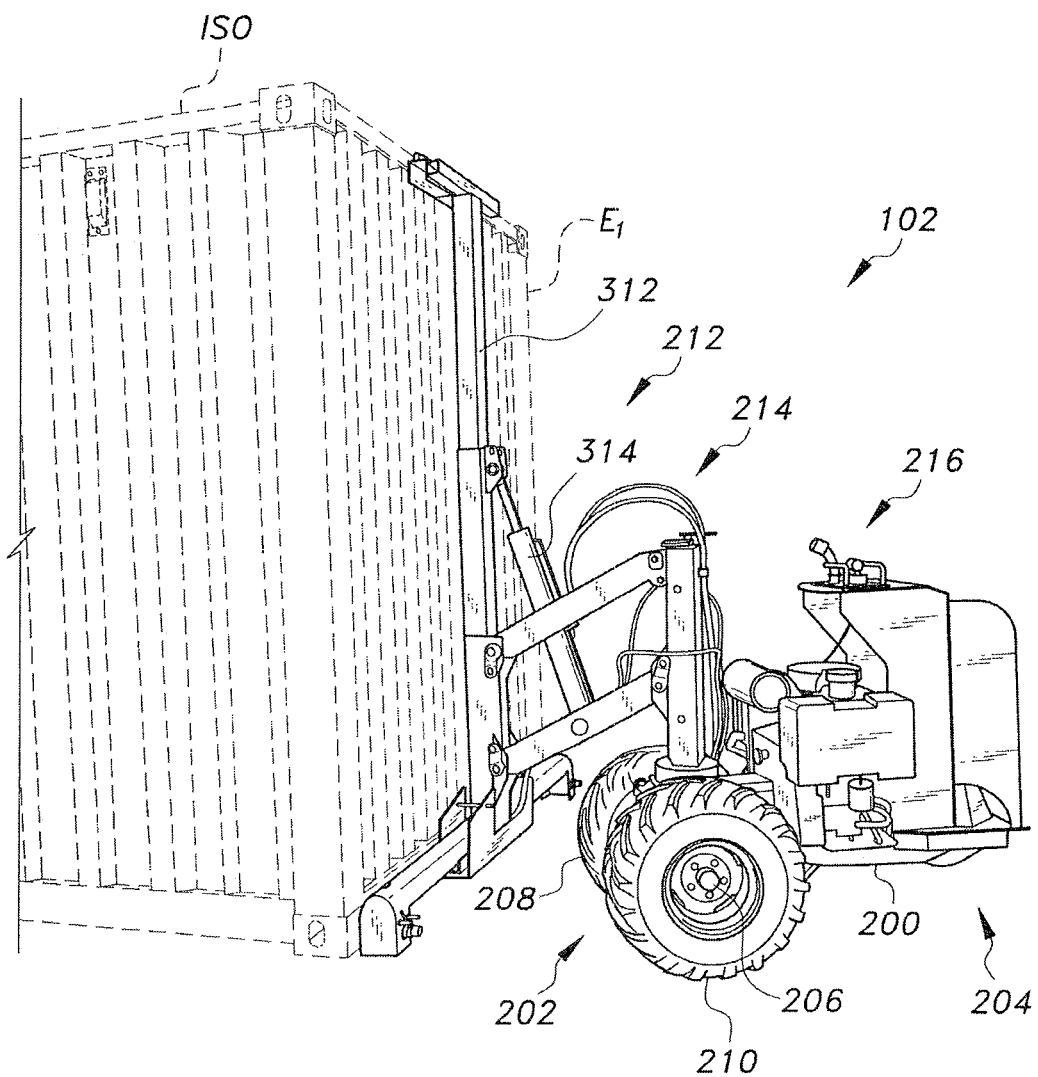
FIG. 2 is an environmental partial perspective view of the powered hand truck of FIG. 1, shown connected to and supporting a first end of the ISO container.

A container engagement mechanism 212 extends from the drive axle end 202 of the chassis 200 and includes a height adjustment mechanism 214, similar to the forklift height adjustment mechanism described in the '931 U.S. patent. The height adjustment mechanism 214 adjusts the height of the container engagement mechanism 212 relative to the first and second drive wheels 208 and 210. A prime mover, e.g., an internal combustion engine, electric motor, etc., is installed generally medially on the chassis 200 to drive the two drive wheels 208, 210 and the height adjustment mechanism 214, using either a mechanical or a hydraulic drive system. A control system 216, which is located on a pedestal adjacent the caster wheel end 204 of the chassis 200, enables an operator to control the prime mover, the first and second drive wheels 208 and 210, and the height adjustment mechanism 214, as described in the '931 U.S. patent, cited above. The operator may stand upon a platform at the caster wheel end 204 of the chassis 200 and operate the control system 216 therefrom, or may, alternatively, operate the powered hand truck 102 remotely, as provided in the cited '931 U.S. patent. Although FIG. 2 depicts a two wheel drive system, it is readily seen that a two track system or other type of conventional drive system may be employed.

Figure 3:
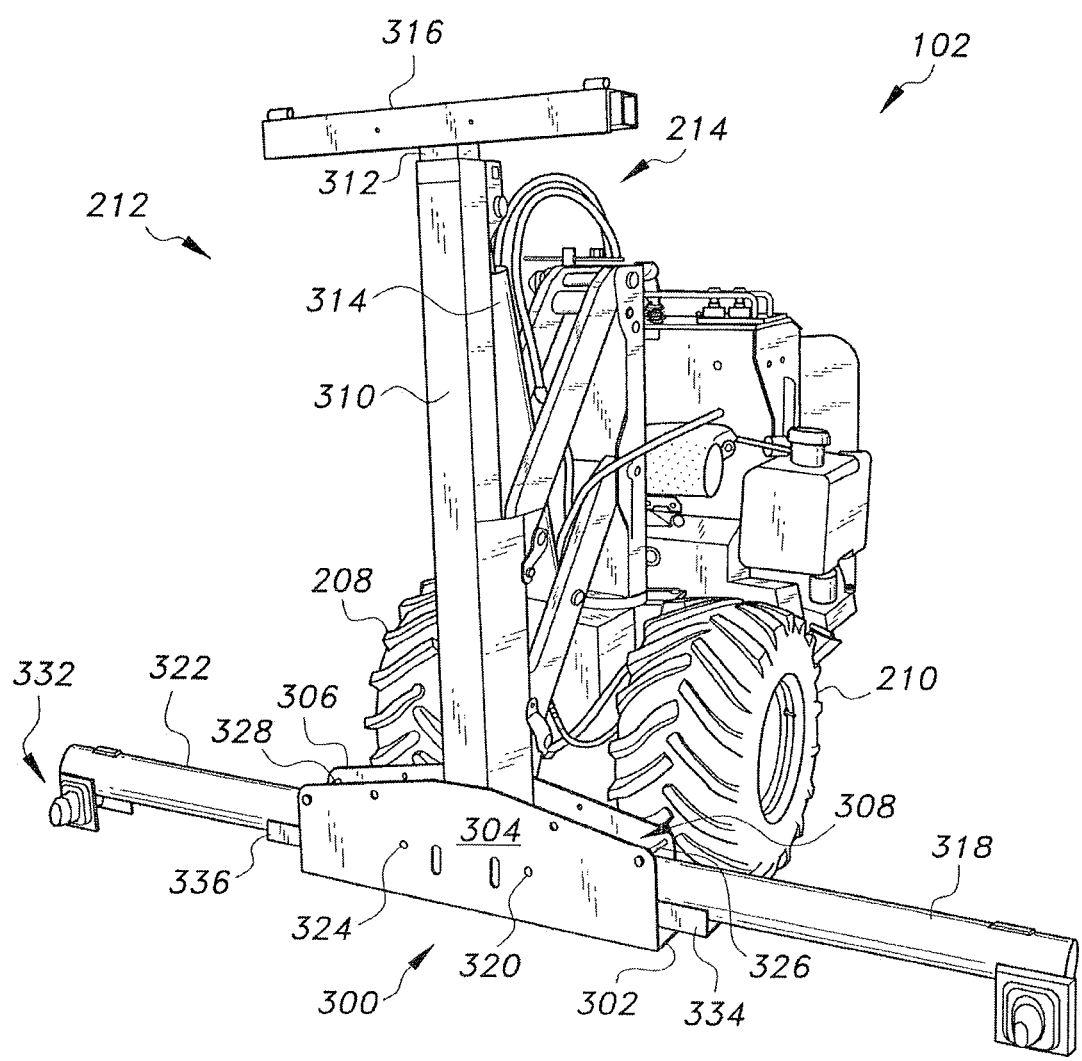
FIG. 3 is a perspective view of the powered hand truck of FIG. 1, showing the booms of the hand truck in an operative, lowered position.
Figure 4:
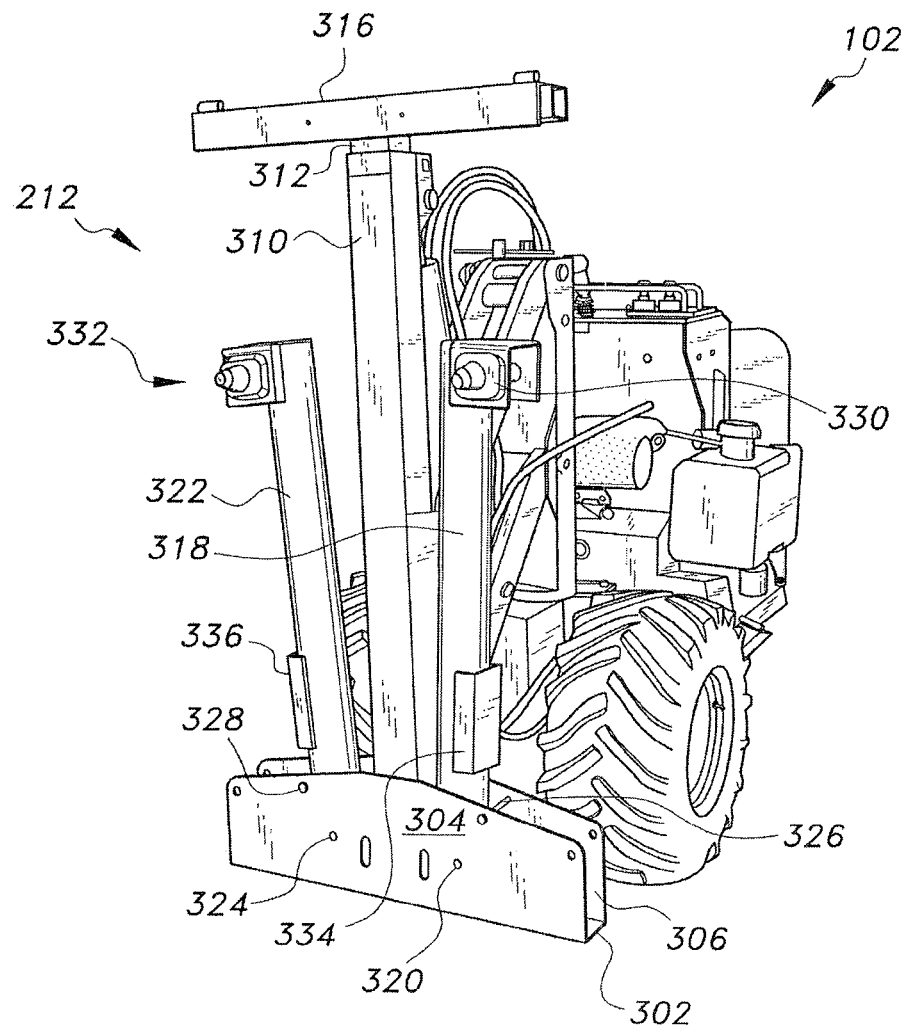
FIG. 4 is a perspective view of the powered hand truck of FIG. 1, showing the booms of the hand truck in a compact upright position.

The details of the container engagement mechanism 212 are shown in FIGS. 3-5. FIG. 3 shows the container engagement mechanism 212 in the operative lowered position. The container engagement mechanism 212 includes a channel-shaped lower housing 300. The lower housing 300 includes a horizontal bottom plate 302, a front vertical plate 304 and a rear vertical plate 306 that form the channel 308. A lower vertical tube 310 (depicted as a square shaft) extends vertically from the center of the bottom plate 302 and is connected to the height adjustment mechanism 214 to allow the container engagement mechanism 212 to be lifted and lowered by the height adjustment mechanism 214. An upper vertical tube 312 (depicted as a square shaft) is telescopically mounted within the lower vertical tube 310 and is moved upward and downward relative to the lower vertical tube 310 by a lifting system 314, which may be either a hydraulic cylinder or a mechanical lifting system. An upper horizontal square stabilizer bar 316 is mounted to the top of the upper vertical tube 312 and contacts the upper portion of the end $E_1$ of the ISO container, (see FIG. 2), to stabilize the ISO container. The upper vertical tube 312 can be moved upward and downward by the lifting system 314, depending on the height of the ISO container (generally 8 to 8.5 feet).

A right boom 318 is rotatably mounted to the lower housing 300 within the channel 308 by a first boom pin 320 that extends through the front vertical plate 304, the proximate end of the right boom 318, and the rear vertical plate 306. A left boom 322 is rotatably mounted to the lower housing 300 within the channel 308 by a second boom pin 324 that extends through the front vertical plate 304, the proximate end of the left boom 322 and the rear vertical plate 306. A right boom restraining pin 326 extends through the front vertical plate 304 and the rear vertical plate 306 just above the right boom 318 to maintain the right boom 318 in its operative, lowered position. A left boom restraining pin 328 extends through the front vertical plate 304 and the rear vertical plate 306 just above the left boom 322 to maintain the let boom 322 in its operative, lowered position. The distal end of the right boom 318 includes an ISO compliant male twist lock right connector 330 having a shaft with a cam for engaging standard female twist lock connectors on the end $E_1$ of the ISO container in a twist lock manner. Such a twist lock is shown in U.S. Pat. No. 3,749,438 issued on Jul. 31, 1973 to Loomis et al., incorporated herein by reference. The distal end of the left boom 322 includes a similar ISO compliant connector 332. When the container engagement mechanism 212 is in the operative lowered position, as shown in FIG. 3, the distance between the ISO compliant connector 330 and the ISO compliant connector 332 is the same as the distance between the ISO corner connectors on the ISO container (slightly less than the 8-foot standard width of most ISO containers). A right U-shaped contact member 334 is connected (preferably welded) to the right boom 318, and a left U-shaped contact member 336 is connected (preferably welded) to the left boom 322 close to its proximate end. The right U-shaped contact member 334 and the left U-shaped contact member 336 contact the bottom plate 302 when the container engagement mechanism 212 is in the operative, lowered position, as shown in FIG. 3.

FIG. 4 shows the container engagement mechanism 212 with the booms 318, 322 of the hand truck 102 in a compact upright position. In this position, the first boom restraining pin 326 extends through the front vertical plate 304 and the rear vertical plate 306, just to the right of the right boom 318 to maintain the right boom 318 in its compact upright position. In this position, the second boom restraining pin 328 extends through the front vertical plate 304 and the rear vertical plate 306, just to the left of the left boom 322 to maintain the left boom 322 in its compact upright position. It should be understood that in the unusual circumstance where only a single ISO compliant connector is available, the container engagement mechanism 212 can be used in different configurations, wherein one of the booms 318, 322 is in its operative lowered position, while the other boom 322, 318 is in its compact upright position.

Figure 5A:
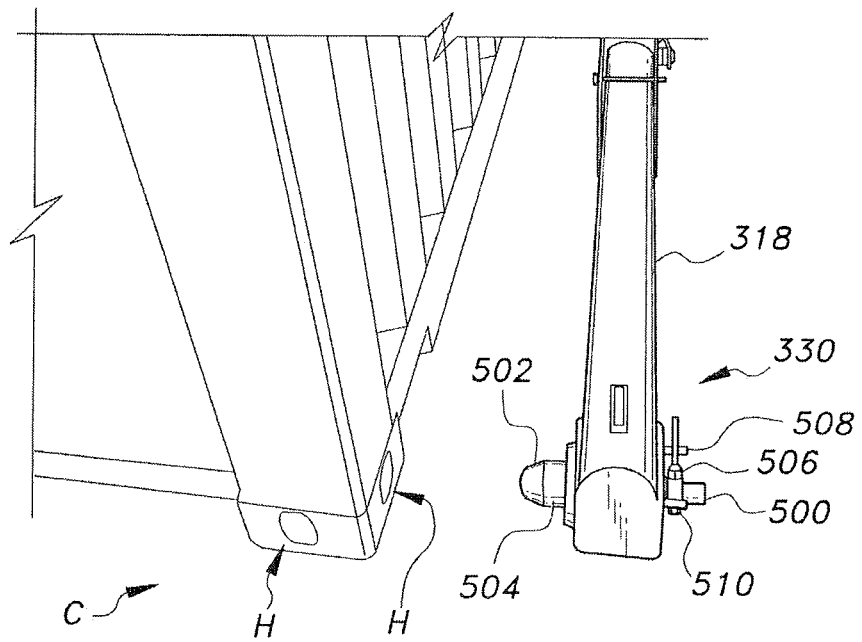
FIG. 5A is an environmental partial perspective view of an ISO compliant right connector of the powered hand truck of FIG. 1, shown disconnected from and adjacent to a connector on the first end of the ISO container.
Figure 5B:
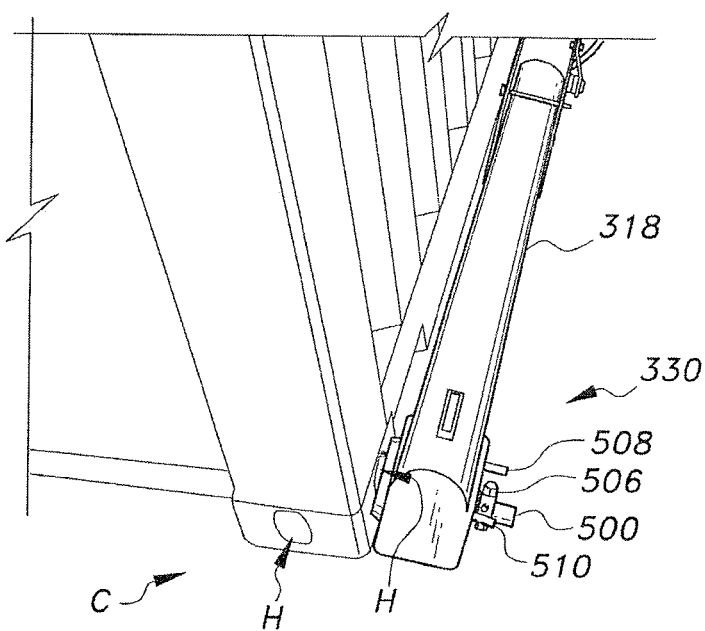
FIG. 5B is an environmental partial perspective view of the ISO compliant right connector of FIG. 5A, shown connected to the connector on the first end of the ISO container.

FIGS. 5A-5B show the details of the ISO compliant male twist lock connector 330 and its mating female connector C on the first end $E_1$ of the ISO container 100. It should be understood that the following explanation equally applies to the ISO compliant connector 332, connector 332 being a mirror image of connector 330. The connector C on the ISO container includes holes H that are rounded and oblong, such that their height is greater than their width. The connector 330 includes a shaft 500 with a cam 502 at its distal end. The shaft 500 and the cam 502 are rotatably mounted to the distal end of boom 318. In the position shown in FIG. 5A, the cam 502 has a height greater than its width such that the cam 502 can pass through the hole H. A collar 504 that surrounds the shaft 500 also has a height greater than its width such that the collar 504 can also enter the hole H and is fixed to boom 318, such that it does not rotate. A lever 506 is attached to the proximate end of shaft 500, for manually rotating the shaft 500 and the cam 502. In the position shown in FIG. 5A, the lever 506 abuts an unlocked lever limit stop 508. Once the hand truck 102 has positioned the container engagement mechanism 212 into engagement with the end $E_1$ of the ISO container, the cam 502 and collar 504 enter the hole H, with the cam 502 clearing the walls of the hole 1, as the length of the collar 504 is slightly greater than the thickness of the wall of the connector C that surrounds the hole H. As shown in FIG. 5B, lever 506 has been used to rotate the shaft 500 and cam 502 about 90° such that lever 506 abuts a locked lever limit stop 510 and the cam 502 locks into hole H, similar to the a twist lock shown in U.S. Pat. No. 3,749,438, cited above.

Figure 6:
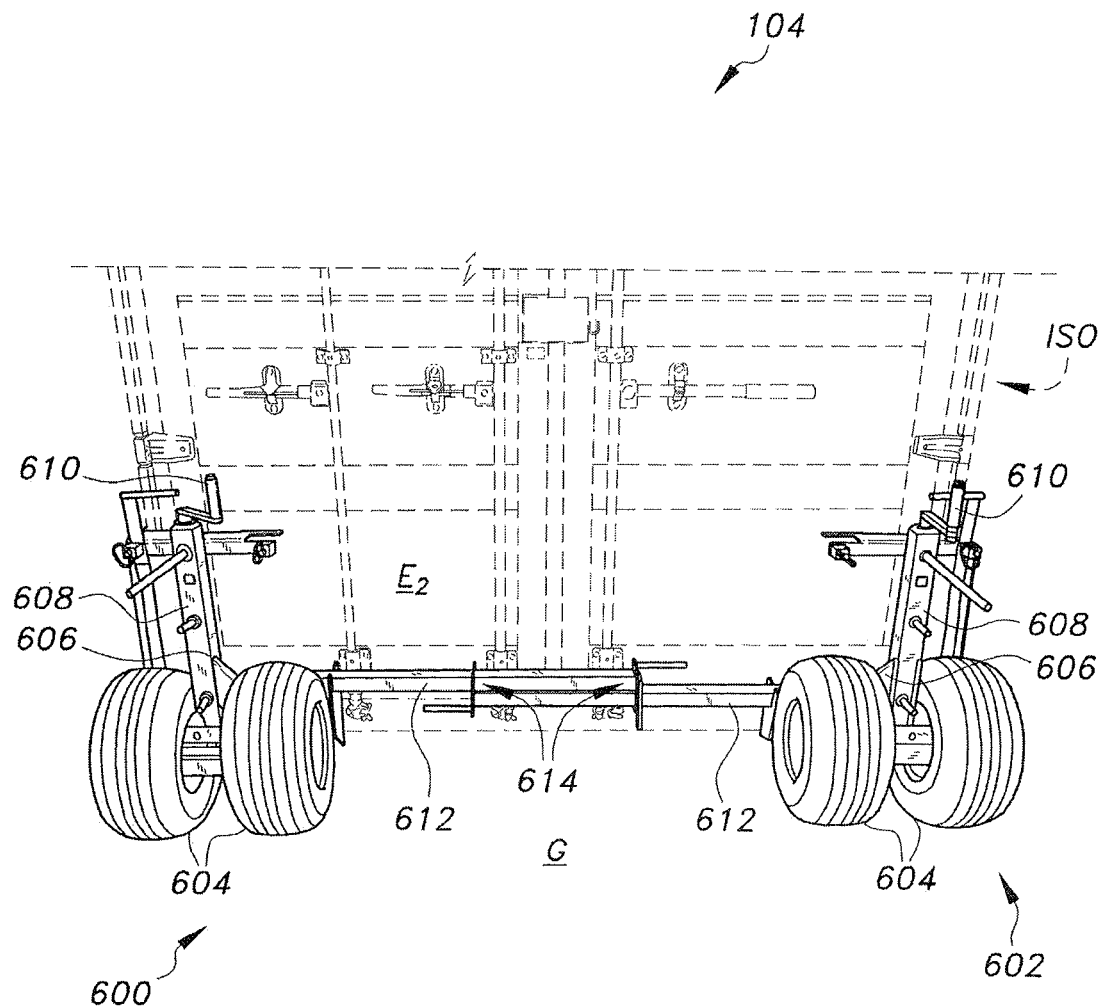
FIG. 6 is an environmental side view of the container of FIG. 1, showing the dollies connected to and supporting a second end of the ISO container, with their booms in a lowered, interlocked, operative position.
Figure 7:
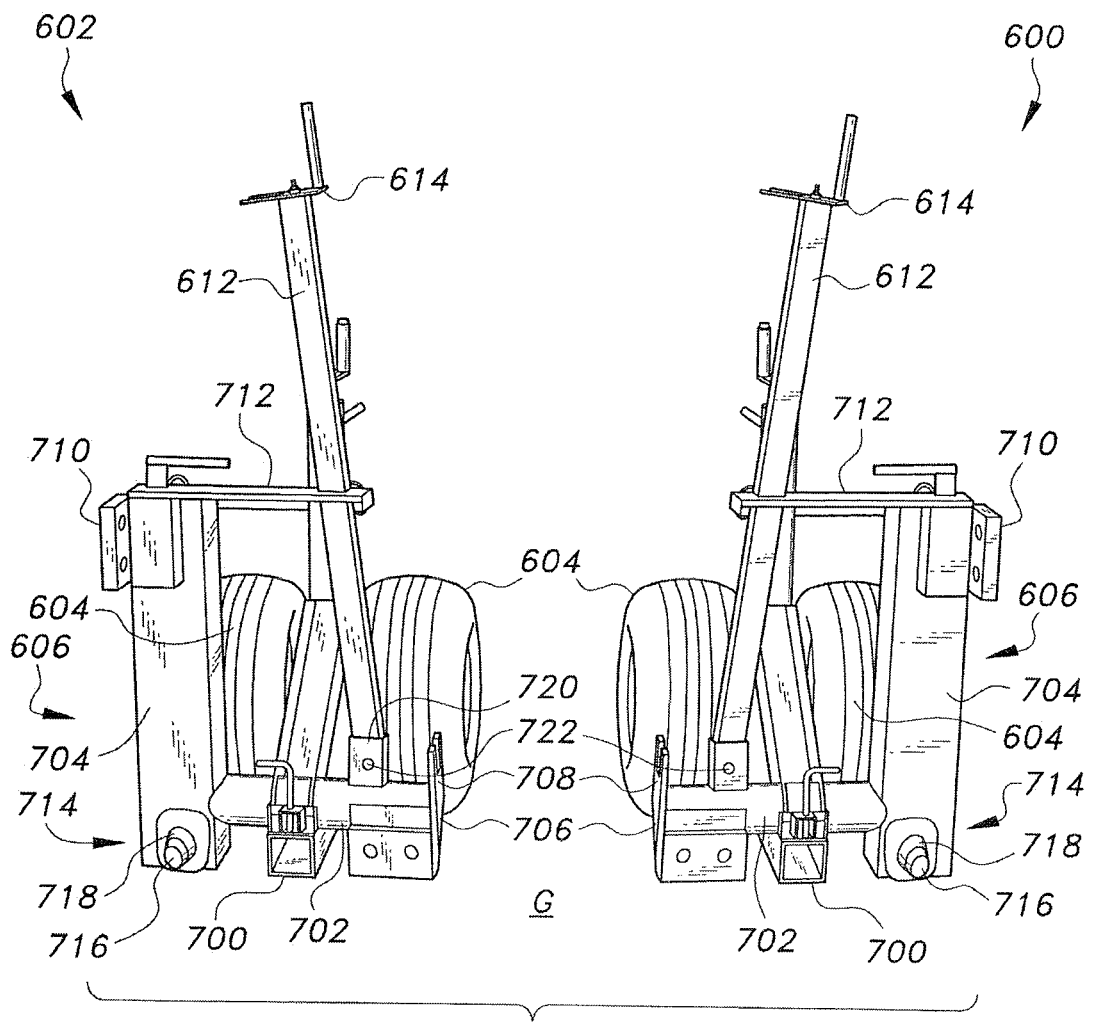
FIG. 7 is a front view of the dollies of FIG. 1, showing the booms of the dollies in a compact upright position.
Figure 8:
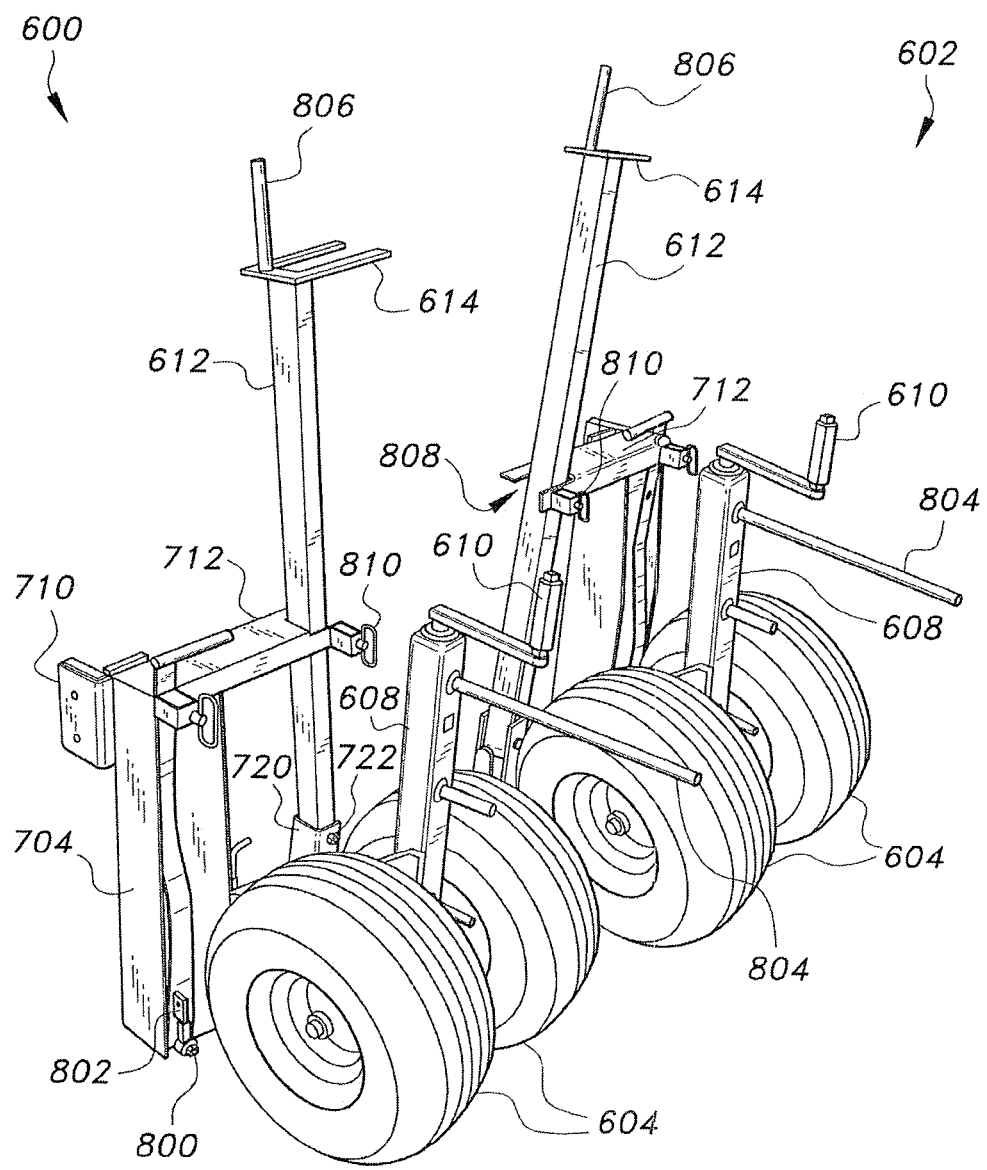
FIG. 8 is a perspective view of the dollies of FIG. 7 as seen from the rear, showing the booms of the dollies in a compact upright position.

The details of the two dolly system 104 are shown in FIGS. 6-8. In FIG. 6, a first dolly 600 is shown connected to a second dolly 602 in their operative position. In FIGS. 7-8, the first dolly 600 and the second dolly 602 are shown separated and in their compact position. Each of the dollies 600, 602 is generally constructed like the dollies shown in the U.S. patent application publication US 2017/0174452 A1, filed on Dec. 14, 2016 and published on Jun. 22, 2017 to Steven Borntrager et al., which is incorporated herein by reference in its entirety, except that the present dollies include a lifting mechanism with twist lock connectors instead of forklift tines. Each of the dollies 600, 602 includes a pair of closely spaced wheels 604 and a frame 606 extending between the wheels 604. A horizontal base member 700 extends forward from the frame 606 between the wheels 604 and has a cross beam 702 attached orthogonally across its front end. An upright member 608 extends upward from between the two wheels 604 and is supported against the frame 606 by two diagonal struts attached to the base assembly 700. The upright member 608 provides for the adjustment of the height of the frame 606 relative to the wheels 604, e.g., a conventional screw jack mechanism within the upright member 608, or other means as desired. A crank 610 extends from the top of the upright member 608 for operation of the screw jack mechanism.

The frame 606 of the first dolly 600 and the second dolly 602 are substantially mirror images of one another. A boom 612 is pivotally attached to the cross beam attached to the base 700, and each boom 612 includes a boom engaging bracket 614 at its distal end, such that when the booms 612 are in their lowered operative positions, as shown in FIG. 6, the boom engaging brackets 614 engage the opposite boom 612 to provide alignment between the first dolly 600 and the second dolly 602. Further details of the frames 606 are best seen in FIG. 7. The base 700 supports a horizontal cross beam 702. The horizontal beam 702 supports a post 704 on its outer end and a beam supporting bracket 706 on its inner end, mounted above a stop. The top 708 of the beam supporting bracket 706 is U-shaped for receipt and support of the associated boom 612 therein when the boom 612 is in its lowered, operative position, as shown in FIG. 6. The boom 612 is rotatably attached to the horizontal beam 702 using a U-shaped bracket 720 and a pin 722 that extends through two holes in the U-shaped bracket 720 and a hole in the proximate end of the boom 612. The top of the post 704 includes an outwardly disposed bracket 710 that engages the sides of the ISO container proximate to the end $E_1$ of the container, such that when the dollies 600, 602 are attached to one another, the end $E_1$ of the ISO container is between the outwardly disposed brackets 710 to provide lateral support for the dollies 600, 602. The top of the post 704 also includes an inwardly extending bracket 712 for supporting the associated boom 612 when the boom 612 is in its compact upright position, as shown in FIGS. 7-8. The bottom of the post 704 includes an ISO compliant male twist lock connector 714 for engaging its mating female connector C on the second end $E_2$ of the ISO container, similar to the ISO compliant connectors 330, 332, described above. Similar to the connectors 330, 332, the connector 714 includes a shaft 800 (FIG. 8) having a cam 716 and a collar 718 at its distal end and a lever 802 attached to its proximate end, for manually rotating the shaft 800 and the cam 716.

FIG. 8 shows details of the rear of the dollies 600, 602. The back of the upright member 608 has a dolly handle 804 attached close to its top end for use in manually moving the associated dolly 600, 602. The boom engaging bracket 614 has a boom handle 806 attached thereto for manually lowering or raising the boom 612. The inwardly extending bracket 712 includes a U-shaped opening 808 for receipt of the boom 612 when it is in the compact upright position, as shown in FIGS. 7-8. A spring-loaded pin 810 is attached to one side of the U-shaped opening 808 to maintain the boom 612 within the U-shaped opening 808.

In use, the two dollies 600 and 602 are attached to the end $E_2$ of the ISO container 100 by inserting the male twist lock connectors 714 into the female twist lock connectors or receptacles built into the ISO container 100 below the corners of the container and rotating the cams 716. The two dollies 600 and 602 are linked by rotating the booms 612 towards each other and securing the brackets 614 on the overlapping booms 612. The powered hand truck 102 is secured to the opposite end $E_1$ of the container 100 using the twist lock connectors 330, 332 and used to raise the end $E_1$ of the container 100, tilting the container so that the end $E_2$ bears against the wheels 604 of the dollies 600, 602, enabling the container 100 to be moved without the use of expensive cranes and sidelifters.

It is to be understood that the powered hand truck and dolly system for ISO containers is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A powered hand truck and dolly system for ISO containers, comprising:
   a powered hand truck having:
   a chassis having a first end, a second end opposite the first end, and a drive system mounted on the chassis;
   a container engagement mechanism extending from the first end of the chassis, the container engagement mechanism having:
   a lower housing;
   a right boom having a proximate end rotatably mounted to the lower housing and a distal end having an ISO compliant twist lock connector attached thereto;
   a left boom having a proximate end rotatably mounted to the lower housing and a distal end having an ISO compliant twist lock connector attached thereto; and
   a height adjustment mechanism for adjusting a height of the container engagement mechanism relative to the chassis; and
   at least one dolly having:
   a pair of closely spaced wheels;
   a frame extending between the wheels, the frame including a base; and
   an upright member extending upward from between the two wheels, the upright member being attached to the base of the frame so that the upright member provides for an adjustment of the height of the frame relative to the wheels, the base of the frame having an ISO compliant twist lock connector attached thereto;
   wherein the powered hand truck and the at least one dolly are adapted for connection to the ISO container by connection of the twist lock connectors to mating twist lock receptacles below corners of the ISO container in order to lift and move the ISO container;
   wherein the lower housing comprises:
   a horizontal bottom plate;
   a front vertical plate;
   a rear vertical plate, the horizontal bottom plate, the front vertical plate and the rear vertical plate forming a channel, the proximate ends of the right boom and the left boom being rotatably mounted to the lower housing within the channel and the distal ends of the right boom and the left boom extending beyond the channel;

a lower vertical tube extending vertically from a center of the bottom plate, the lower vertical tube being connected to the height adjustment mechanism to allow the container engagement mechanism to be lifted and lowered by the height adjustment mechanism;

an upper vertical tube having a top, the upper vertical tube being telescopically mounted within the lower vertical tube;

a lifting system connected to the upper vertical tube for extending and retracting the upper vertical tube; and an upper horizontal square stabilizer bar mounted to the top of the upper vertical tube, the stabilizer bar being adapted for contacting an upper portion of the ISO container to stabilize the ISO container.

2. The powered hand truck and dolly system as recited in claim 1, wherein the drive system comprises:
an axle extending laterally across the first end of the chassis, the axle having opposed first and second ends;
a first drive wheel mounted on the first end of the axle; and
a second drive wheel mounted on the second end of the axle.

3. The powered hand truck and dolly system as recited in claim 2, wherein the chassis further comprises a caster wheel on the second end of the chassis.

4. The powered hand truck and dolly system as recited in claim 1, wherein the at least one dolly comprises a first dolly and a second dolly.

5. The powered hand truck and dolly system as recited in claim 4, wherein the frames of the first dolly and the second dolly are mirror images of each other.

6. The powered hand truck and dolly system as recited in claim 5, wherein:
the first dolly further comprises:
a first cross beam attached to the base;
a first boom having a first proximate end and a first distal end, the first proximate end being pivotally attached to the first cross beam; and
a first boom engaging bracket attached to the first distal end of the first boom; and
the second dolly further comprises:
a second cross beam attached to the base;
a second boom having a second proximate end and a second distal end, the second proximate end being pivotally attached to the second cross beam; and
a second boom engaging bracket attached to the second distal end of the second boom;
wherein, when the booms are lowered in operative positions, the first boom engaging bracket engages the second boom and the second boom engaging bracket engages the first boom to provide alignment between the first dolly and the second dolly.

7. A powered hand truck for ISO containers, comprising:
a chassis having a first end, a second end opposite the first end, and a drive system mounted on the chassis;
a container engagement mechanism extending from the first end of the chassis, the container engagement mechanism having:
a lower housing;
a right boom having a proximate end rotatably mounted to the lower housing and a distal end having an ISO compliant twist lock connector attached thereto;
a left boom having a proximate end rotatably mounted to the lower housing and a distal end having an ISO compliant twist lock connector attached thereto; and
a height adjustment mechanism for adjusting a height of the container engagement mechanism relative to the chassis;

wherein the powered hand truck is adapted for connection to the ISO container by connection of the twist lock connectors to mating twist lock receptacles below corners of the ISO container in order to lift and move the ISO container;

wherein the lower housing comprises:
a horizontal bottom plate;
a front vertical plate;
a rear vertical plate, the horizontal bottom plate, the front vertical plate and the rear vertical plate forming a channel, the proximate ends of the right boom and the left boom being rotatably mounted to the lower housing within the channel and the distal ends of the right boom and the left boom extending beyond the channel;

a lower vertical tube extending vertically from a center of the bottom plate, the lower vertical tube being connected to the height adjustment mechanism to allow the container engagement mechanism to be lifted and lowered by the height adjustment mechanism;

an upper vertical tube having a top, the upper vertical tube being telescopically mounted within the lower vertical tube;

a lifting system connected to the upper vertical tube for extending and retracting the upper vertical tube; and an upper horizontal square stabilizer bar mounted to the top of the upper vertical tube, the stabilizer bar being adapted for contacting an upper portion of the ISO container to stabilize the ISO container.

8. The powered hand truck for ISO containers as recited in claim 7, wherein the drive system comprises:
an axle extending laterally across the first end of the chassis, the axle having opposed first and second ends;
a first drive wheel mounted on the first end of the axle; and
a second drive wheel mounted on the second end of the axle.

9. The powered hand truck for ISO containers as recited in claim 8, wherein the chassis further comprises a caster wheel on the second end of the chassis.

10. The powered hand truck for ISO containers as recited in claim 7, further comprising:
a first boom pin, the first boom pin rotatably mounting the right boom to the lower housing within the channel and extending through the front vertical plate, the proximate end of the right boom, and the rear vertical plate; and
a second boom pin, the second boom pin rotatably mounting the left boom to the lower housing within the channel and extending through the front vertical plate, the proximate end of the left boom, and the rear vertical plate.

11. The powered hand truck for ISO containers as recited in claim 10, wherein the right boom and the left boom each have an operative lowered position and a compact upright position, the powered hand truck for ISO containers further comprising:
a first boom restraining pin extending through the front vertical plate and the rear vertical plate to the right of the right boom in order to maintain the right boom in its compact upright position; and a second boom restraining pin extending through the front vertical plate and the rear vertical plate to the left of the left boom in order to maintain the left boom in its compact upright position.

12. The powered hand truck for ISO containers as recited in claim 11, wherein
the right boom restraining pin removably extends through the front vertical plate and the rear vertical plate to the right of the right boom in order to maintain the right boom in its operative, lowered position; and
the left boom restraining pin removably extends through the front vertical plate and the rear vertical plate to the left of the left boom in order to maintain the left boom in its operative, lowered position.

13. The powered hand truck for ISO containers as recited in claim 7, wherein
the right boom and the left boom are each pivotal between an operative lowered position and a compact upright position, the powered hand truck for ISO containers further comprising:
a right U-shaped contact member connected to the right boom close to its proximate end; and
a left U-shaped contact member connected to the left boom close to its proximate end, the right U-shaped contact member and the left U-shaped contact member contacting the bottom plate when the right boom and the left boom are in their operative, lowered position.

\* \* \* \* \*